UNITED STATES PATENT OFFICE.

AUGUST BERNHARDT DRAUTZ, OF STUTTGART, GERMANY.

ART OF SILVERING MIRRORS.

SPECIFICATION forming part of Letters Patent No. 433,074, dated July 29, 1890.

Application filed February 15, 1890. Serial No. 340,581. (No specimens.)

*To all whom it may concern:*

Be it known that I, AUGUST BERNHARDT DRAUTZ, of Stuttgart, in the Kingdom of Würtemberg, Germany, have invented a new and useful Improvement in the Art of Silvering Mirrors, of which the following is a specification.

In carrying out my process I take the finest quality of polished glass plates and, having rinsed them with pure water, place them upon a so-called "coating-table," which has been leveled by means of a spirit-level, warm them slightly, and flood them with the silvering solution. If desired, the plates may be allowed to remain on the coating-table until all the silver, or at least the greatest portion thereof, has been reduced or precipitated to coat or back the glass plate. The remaining liquid is then poured off and the glass plate is rinsed with warm distilled water. It is then placed upon a drying-table arranged similarly to the coating-tables, and after drying is coated with a suitable and specially-prepared varnish.

In preparing the solution for forming the silver deposit I begin by making three separate solutions, which are not to be mixed until shortly before use. I may, however, for some purposes restrict myself to only two solutions.

The solutions are prepared as follows:

*First solution.*—I take five grams of chemically-pure nitrate of silver, dissolve the same in about twenty-five grams distilled water, and make the solution slightly ammoniacal. Then dilute the solution so formed in the proportion of thirty-five grams of the same to one liter of water.

*Second solution.*—About sixty-three grams of pure water, 4.5 grams chemically-pure tartrate of potassium and sodium, and 2.64 grams of sugar of milk or 2.5 grams finest rock-candy are boiled together until fully dissolved, and are then boiled with 0.075 grams of sulphate of silver and 0.020 grams of sulphate of lead or other lead compound and sulphuric acid (1.10) for about twenty minutes until grape-sugar is formed (which occurs notably where rock-candy has been employed) and a slight portion of the dissolved silver and lead are precipitated—*i. e.*, until the solution has acquired reducing powers.

*Third solution.*—About sixty-two grams pure water, 0.9 grams of tartrate of potash and soda, and 1.1 grams of nitrate of silver are boiled together until reduction of the silver takes place, which occurs in about ten minutes. The solution is then filtered and diluted with pure water to 0.15 liters.

Although the best results are obtained when the solutions are kept separate, yet solutions two and three may be united at the time of preparation by simply mixing the component substances and proceeding as described in connection with the several solutions.

Before coating the mirrors equal parts of solutions two and three, if they have been prepared separately, are mixed and diluted with distilled water, a little sulphuric acid being added. Equal parts of solution one and the mixture from solutions two and three are now united and poured upon the glass plates, as above described, and in the usual manner.

Mirrors produced by this method are eminently capable of resisting the influence of air and moisture, always retaining their beautiful bluish tint. This bluish tint is due to the lead forming part of the coating-liquid, and may be heightened or diminished by adding more or less lead compound.

It should be noted, finally, that the separation or reduction of lead takes place whenever silver is reduced in its presence, and it is particularly to be observed that therefore the tint which I impart to silvered mirrors by my process is not confined to the specific solutions or compounds described, but may be carried out in connection with any desired process of and solutions or compounds for precipitating silver.

What I claim, therefore, and desire to secure by Letters Patent, is—

1. A solution for silvering mirrors, consisting of a silver solution in combination with a lead compound, substantially as described.

2. A solution for silvering mirrors, consisting of ammoniacal nitrate of silver, tartrate of soda and potash, milk-sugar, sulphate of silver, a lead salt, sulphuric acid, and water, all substantially as described.

In testimony whereof I have signed this specification in the presence of two subscribing witnesses.

AUGUST BERNHARDT DRAUTZ.

Witnesses:
   GUSTAV GROSS,
   JOHANN NIEUHAUS ZEITLER.